Feb. 11, 1969 T. M. HERTZ 3,427,596

SYSTEM FOR PROCESSING DATA INTO AN ORGANIZED SEQUENCE OF COMPUTER WORDS

Filed March 7, 1967 Sheet 1 of 2

INVENTOR.
THEODORE M. HERTZ

BY Robert G Rogers

ATTORNEY

INVENTOR.
THEODORE M. HERTZ
BY Robert G. Rogers
ATTORNEY

United States Patent Office 3,427,596
Patented Feb. 11, 1969

3,427,596

SYSTEM FOR PROCESSING DATA INTO AN ORGANIZED SEQUENCE OF COMPUTER WORDS

Theodore M. Hertz, Whittier, Calif., assignor to North American Rockwell Corporation, a corporation of Delaware Filed Mar. 7, 1967, Ser. No. 621,234
U.S. Cl. 340—172.5 13 Claims
Int. Cl. G11b *13/00*

ABSTRACT OF THE DISCLOSURE

A system for processing data into an organized array by comparing data being processed with data comprising a stored array and inserting the processed data at a proper location with respect to the stored data comprising the array, whereby a desired array is achieved. The system comprises a serial storage medium having a storage track, or channel, and spaced transducers for forming a processing and reducible gap, or space, between adjacent words of the stored array. The gap has maximum spacing equivalent to the number of words being processed and may be reduced after each word has been inserted.

In certain systems, a single word may be involved, while in other embodiments a plurality of words may be involved. A particular system may require one additional rotation of the recording medium before the word can be inserted, while in other embodiments, the word is inserted during the same rotational cycle.

BACKGROUND OF THE INVENTION

*Field of the invention*

The invention relates to a system for orienting data according to a predetermined array and, more particularly, to such a system for forming a precessing space between adjacent data storage locations and for reducing said space when data is inserted into the location of the space during an interval of rotation by a storage track.

*Description of prior art*

A search was conducted in connection with the present invention, although no pertinent art was discovered. Certain patents from the search are described below, although neither are believed to be closely related to the present invention.

Patent No. 2,923,922 teaches a system for using pulses to indicate where incoming data is to be stored and last-item-marker pulses for indicating the position of the last item written into a storage location. As a sector is filled, the last item pulse associated with that section is advanced to the next section.

Patent No. 2,770,797 for a data storage apparatus teaches an improved drum storage unit having a rotating magnetic drum on which the digits of a value are recorded serially together with serial reading and recording means for causing each value to be revolved around the drum from one location to another as the drum rotates including a shift control means for shifting the digits of a value relative to certain reference points on the drum as the value is revolved.

Desirably, a system is required which may be used with a computer memory for sorting, or organizing, data into a desired order or for re-ordering data words on a recording track by making insertions at desired locations within the track without interfering with the other data stored on the track. The system should be provided with the capability of making the insertions in as short a time as possible, so as not to impair normal computer operations.

SUMMARY OF THE INVENTION

Briefly, the invention comprises a serial storage medium having a plurality of adjacent storage locations on a storage track including means for forming a reducible and precessing gap between said adjacent locations whereby computer words can be inserted into locations for maintaining the orderly of said data on said track, and the gap reduced accordingly. The serial storage medium may be comprised of a rotating disc or drum memory, delay lines, magnetic tape, flip flops, registers, etc.

The system includes means for identifying the beginning of a list. For example, a reference location may be comprised of one word of binary ones or zeros. If the reference location was comprised of binary ones, in a particular embodiment for processing data in an ascending order, binary zeros would be stored initially in the other locations of the track. The opposite would be true for a reefrence word comprised of all zeros for an embodiment processing data in a descending order. After the beginning of a list has been identified, reading and writing transducer means are actuated for writing information onto said track at a location in advance of a location from which it was read. In other words, information is read at one location and written back on the said track at a location spaced apart in the direction of location of said track. In that manner a space equivalent to the number of words to be inserted may be formed.

After the gap is formed, the data from consecutive storage locations is compared with data to be inserted into the ordered sequence. Assuming an ascending order, the comparison is continued until the data on the track is determined to be larger than the data to be inserted. As soon as the determination is made, the data is written onto the storage track in the proper sequence between storage locations. Data words at each location on the track are compared with data words to be written on said track for determining the relative magnitudes of the words. If the data on the track is stored in ascending order the comparison would be made to determine whether or not the data stored on the track was larger than the data to be inserted. In the other case, the comparison would determine whether or not the data on the track was smaller.

In general, the system comprises a plurality of adjacent read and write transducers separated by a plurality of computer words. The number of transducers is determined by the number of words to be inserted during a single revolution. The following formula shows the relation between the number of heads ($h$) and the number of words ($n$), to be inserted, $$n=2^{h-1}-2$$

For example, if the system used three heads two words could be inserted. The maximum precessing gap would be two words. After each word is inserted, means are provided for re-connecting the transducers for reducing the gap. The gap is reduced after each insertion until all the words have been inserted during a single revolution.

In another embodiment, single read and write transducers may be used. The proper insertion location is determined by compare logic during an initial cycle. The track rotates one additional cycle and the data is inserted. Although an additional delay is incurred, the necessity for using an additional read transducer is eliminated. In effect, one transducer is used two times.

Therefore, it is an object of this invention to provide a system for processing a plurality of computer words into a particular array on a serial storage medium having a record channel by using a precessing and reducible gap equivalent to the number of words being processed.

A still further object of the invention is to provide a system for comparing an ordered sequence of computer words stored on a rotating storage track with a word to be inserted on the track, including means for inserting the word in the correct order in the stored sequence of words during the same rotational cycle as the comparison is made.

A still further object of this invention is to provide an improved system for use by serial data processing systems for sorting data into an ordered array during one rotational cycle of the memory.

These and other objects of this invention will become more apparent in connection with the following drawings.

DESCRIPTION OF PREFERRED EMBODIMENTS

Figure 1:
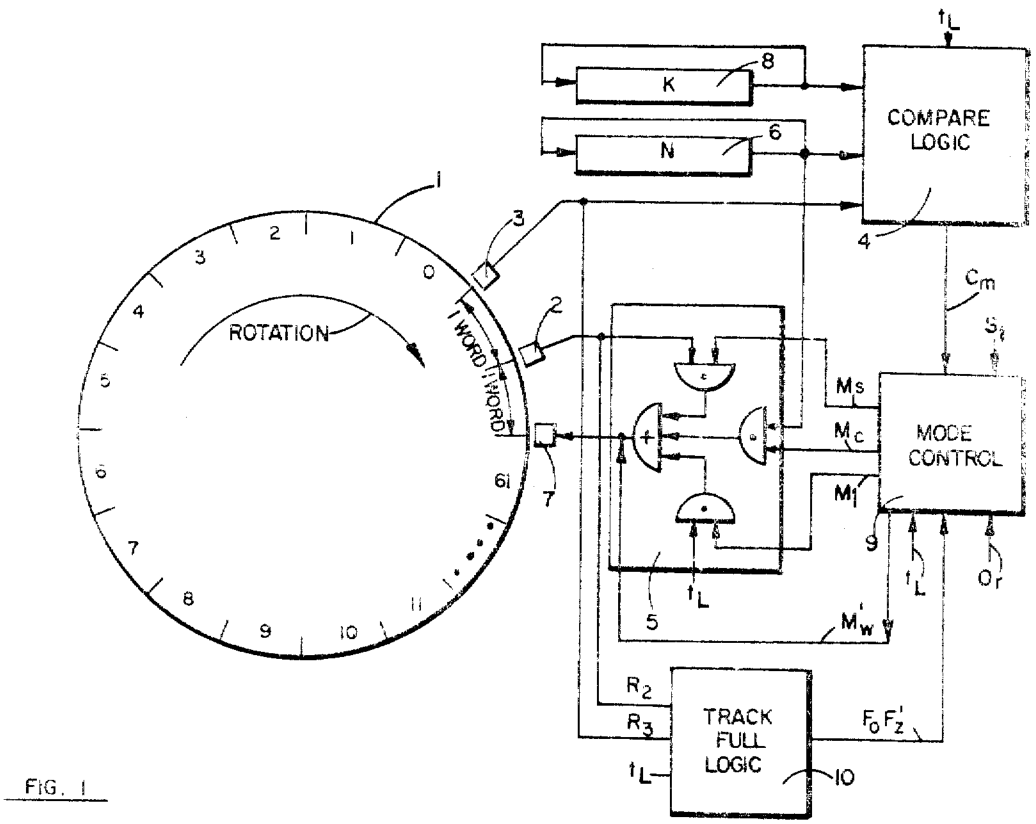
FIGURE 1 illustrates one embodiment of a system for inserting a computer word into proper sequence in a storage location of an ordered storage track during one rotational cycle of a storage track.

FIGURE 1 shows rotating disc 1 including a rotating storage track. Transducers 2 and 3, including flip flops, are disposed adjacent to the storage track for reading information stored therein in word locations 0 through 61. One storage location is equivalent to one computer word.

Transducer 3 is connected to compare logic 4 which may be mechanized by standard flip flops and gating logic for comparing binary numbers and for providing outputs as a function of the relative magnitudes of the numbers. Transducers 2 and 3 for the embodiment shown, are read transducers. The compare means generates an output control signal, $C_m$, to make control means 9 which alters switch means 5 and includes an input from the N register. The N register provides temporary storage for data words to be written into the storage track. Write transducer 7 including a drive flip flop, is disposed adjacent to the storage track for writing data into storage locations on the track. The write transducer is connected to switch means 5.

Switch means 5 is connected between transducers 2 and 7 and between transducer 7 and the N register for controlling the writing of data into the rotating storage track by transducer 7. The switch may comprise three AND gates and an OR gate for interrupting the transfer of data between transducers 2 and 7 and for permitting transducer 7 to write information from the N register onto the storage track.

The switch is controlled by mode control logic 9 which may be mechanized by standard flip flops and gating logic. The logic generates control signals, $M_1$, $M_s$, $M_c$, $M_w$ and $M'_w$ during one rotation of a recording track. $M_1$ is generated only once during the process of filling a recording track, although the other control signals are generated during each rotation. Definitions and logic for the controls are shown below, $$M_1 = \text{Initiate processing cycle} = M'_1 M'_2$$
$$M_s = \text{Search} = M_1 M'_2$$
$$M_c = \text{Copy} = M_1 M_2$$
$$M_w = \text{Wait} = M'_1 M_2$$

where $M_1$ and $M_2$ are flip flops comprising a portion of the mode control logic.

Figure 4:
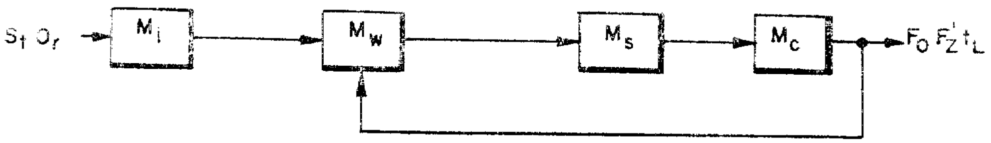
FIGURE 4 illustrates a block diagram of each mode of the system operation.

As shown in FIGURE 4, and as described in more detail in connection with the logic set forth herein, initially the system is in the initiate processing cycle, $M_1$. The $M_1$ mode is entered only once for a processing cycle. In other words, the mode is entered only once prior to filling all the locations on a recording track. Subsequently, the wait mode, $M_w$, is entered into during each rotational cycle of the recording track. Following the wait mode, the search mode is entered into. After the search mode, the copy mode is executed. The process is repeated as shown in FIGURE 4 until all the locations on the recording track are filled at which time a termination signal is generated. As is indicated in connection with the logic, the wait mode is entered directly from the initiate mode.

The sorting operation is initiated by start signal $S_t$, in coincidence with a signal time or origin bit, $O_r$, generated from, for example, a synchronous pre-recorded timing track. The combination re-sets the mode control flip flops to cause the system to enter the $M_1$ mode in accordance with the following logic, $$0^{m}1 = 0^{m}2 = S_t O_r$$

and $S_tO_r$ sets the flip flop of $W_7$ for writing a series of binary ones in a storage location on the recording track as follows, $$1^{w}7 = S_t O_r$$

Flip flop $W_7$ for transducer 7 remains set for writing a full word of ones after which it is zero set for writing all zeros into the remaining locations of the track by, $$0^{w}7 = M_1 t_L$$

The $M_1$ mode is terminated and the wait mode, $M_w$, is initiated at the end of the revolution by, $$1^{m} = M_1 O_r$$

During the wait mode, the $C_m$ flip flop tests $R_2$ for a zero word by the following logic, $$1^{c}m = t_L$$
$$0^{c}m = R_2 M_w t'_L$$

$C_m t_L$ indicates that a zero word has been read at $R_2$ and the wait mode is terminated. The search mode, $M_s$, is initiated following the wait mode by, $$1^{m}1 = 0M_2 = M_w C_m t_L$$

Writing at transducer 7 is disabled because enable gate $W_{7e} = M'_w$ is false during the wait mode. Data precession occurs during the $M_s$ mode by, $$1^{w}7 = R_2 M_s$$
$$0^{w}7 = R'_2 M_s$$

During the $M_s$ mode, words from $R_3$ and $R_n$ are compared during $R_k$ bit times by, $$1^{c}m = R_3 R'_n R_k M_s = t_L$$
$$0^{c}m = R'_3 R_n R_k M_s t'_L$$

$R_n$ comprises a read flip flop in the N register and $R_k$ comprises a read flip flop in the K register.

When $R_3$ is greater than or equal to $R_n$ during $R_k$ bit times, $t_m C_L$ occurs and the $M_s$ mode is terminated. The copy mode, $M_c$, is initiated by, $$1^{m}2 = M_s C_m t_L$$

During the copy mode, the data word in *n* is copied onto the track by, $$1^{w}7 = R_n M_c$$
$$0^{w}7 = R'_n M_c$$

After one word time the $M_c$ mode is terminated and the $M_w$ mode is initiated for the next insertion cycle by, $$0^{m}1 = M_c t_L$$

The process is continued until all the locations on the storage track have been filled. A full track is detected when the reference word of all ones is followed by a nonzero word. Flip flops $F_o$ and $F_z$ comprising the track full logic, test for all ones and all zeros respectively in $R_2$ and $R_3$ by, $$1^f0=t_L$$
$$0^f0=R'_2t'_L$$
$$1^fZ=t_L$$
$$0^fZ=R_3t'_L$$

$F_oF'_zt_L$ is the signal that signifies a full track and terminates the sorting operation.

A summary of the above logic is shown below, $$1^m1=M_wC_mt_L$$
$$0^m1=M_ct_L+S_tO_r$$
$$1^m2=M_sC_mt_L+M_iO_r$$
$$0^m2=M_wC_mt_L+S_tO_r$$
$$1^cm=R_3R'_nR_kM_s+t_L$$
$$0^cm=R'_3R_nR_kM_st'_L+R_2M_wt'_L$$
$$1^w7=R_2M_s+R_nM_c+S_tO_r$$
$$0^w7=R'_2M_s+R'_nM_c+M_it_L$$
$$1^f0=t_L$$
$$0^f0=R'_2t'_L$$
$$1^fZ=t_L$$
$$0^fZ=R_3t'_L$$

Register 6 may comprise a one word recirculating register N, and may be mechanized by flip flops and gating logic. The size of the register is determined by the length of a computer word. The register is filled before each rotational cycle from other storage locations in memory, input devices, or from arithmetic units in a computer or data processor system with which the processing system is connected.

If ordering is according to a field of entry, one word recirculating mask register 8 may be used to define the portion of data words used in making the comparison. In other words, the word may include other information which is not necessary for the comparison. That information is "masked" during the comparison.

For the systems described herein, it is assumed that data words are processed into an ascending order. As a result, during the $M_i$ mode, a word of all ones is written into a storage location. That word, for example, defines the last word on the track and comprises a reference word for the sorting operation. Zeros are written into the remaining track locations during the initial mode. It should be noted that a word of all zeros could have been written onto the track for defining the location of the last word followed by ones in the remaining track locations. In the former case the list of data would be inserted in ascending order since a word of all ones would have a maximum value, whereas in the latter case, the list of data would be sorted in descending order since a word of all zeros would have a minimum value.

At the beginning of the wait mode, the reference word is located between $R_2$ and $W_7$. $C_m$ tests the following zero word which reverse $M_1$ and $M_2$ to form $M_s$. The gap is formed by copying $R_2$ into $W_7$ during the $M_s$ mode. Since $M_s$ began with $W_7$ at the end of the reference word, the gap began at the word immediately following the reference word.

Flip flop $C_m$ in the compare logic is true at $t_L$ time when a word on the track is determined to be greater than a word stored in register N. In other words, during $M_s$ when the last bit difference between $R_3$ and $R_n$ sets true and $R_n$ sets false, $C_m$ is one set. The $R_k$ term insures that the comparison is made between proper descriptor bits within the words. In other words, in some instances, other descriptors may be included in a word, whereas only a particular descriptor portion should be used for the comparison. The $R_k$ term would be false at all times except when the proper descriptor of the data word was being read by $R_n$ and $R_3$.

When $C_m$ is true at the last bit time, $t_L$ of the word, the $M_2$ flip flop is one set and the copy mode, $M_c$, is entered. During the copy mode, $W_7$ copies information from the N register onto the track. The terms, $R_nM_c$, control $W_7$ during that interval.

After the word from register N is inserted, or written, onto the track in the location comprising the precessing gap, $M_1$ is zero set and the wait mode, $M_w$, is entered. During the wait mode, a search is made for the reference word. Flip flop $C_m$ remains one set whenever a word of all zeros passes under $R_2$. The $M_2$ flip flop is zero set and the search mode is entered. The precessing gap is formed as previously indicated during the search mode. The operation is continued until all but one of the locations on the track are filled, at which time track full signal, $F_oF'_z$ is generated and the sorting operation is terminated. When $R_2$ is reading all ones ($F_o$) at the same time that $R_3$ is not reading all zeros ($F_z$) the terminational signal, $F_oF'_zt_L$ is generated.

It is possible to increase the sorting rate to handle two word insertions per disc revolution by moving head 3 one word in the opposite direction of track rotation. Two N registers would be provided with two compare means. The gap of two computer words would be processed by copying from head 3 into head 2 continuously while comparing the head 3 output with two words in the N registers. Logic would have to be provided for establishing that the contents of one register would be less than the contents of the other register. In other words, logic would determine which of the words in the registers would be smaller and therefore should be inserted first. When the compare logic indicated that the word read by transducer 3 exceeded the smaller of the two words in the registers, the smaller word would be copied into the precessing gap by head 7. The word would be copied into the gap at a location just prior to the location of the word compared. At the end of that word time, switch means between head 2 and 7 would become actuated so that head 2 would be copied into head 7. Mode control logic would control transducer interconnection.

The operation would continue substantially as indicated in connection with FIGURE 1, with the output from head 3 being compared with the remaining number in the N register. As soon as the number read by transducer 3 was determined to be greater than the number in the N register, instead of immediately writing the number into the remaining one word of the precessing gap, a one word delay would have to be incurred because of the additional word spacing between transducers 3 and 2.

Figure 2:
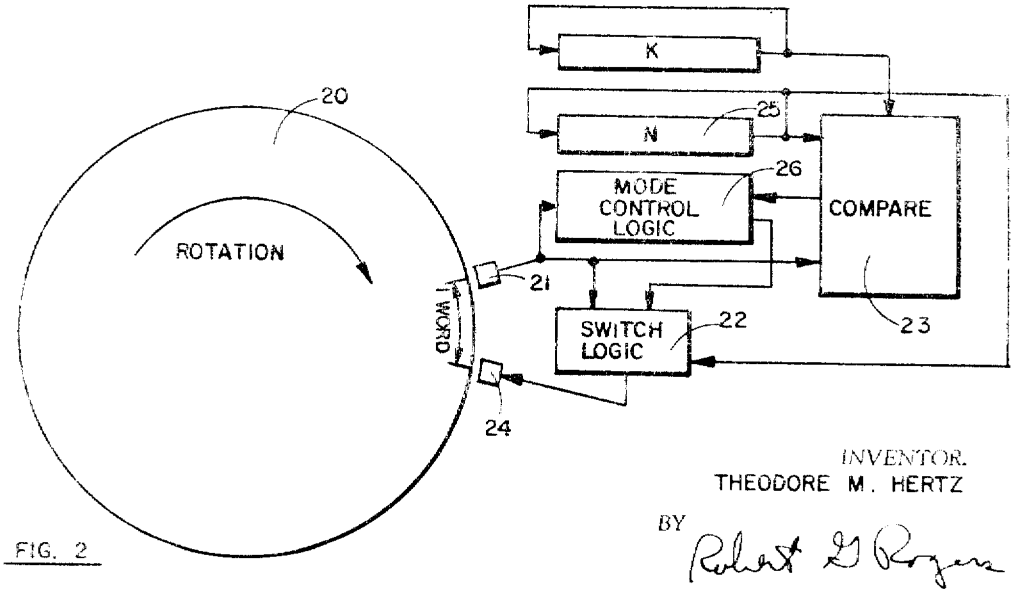
FIGURE 2 illustrates a second embodiment of a system for inserting a computer word sequentially into a storage location of an ordered storage track during the rotational cycle following the cycle in which the insertion location was determined.

FIGURE 2 shows rotating disc 20 comprising a recording track. Read transducer 21 is disposed adjacent to the recording track and is connected to switch 22 means and compare means 23. Write transducer 24 is connected to switch means 22 and disposed adjacent to the read track for writing information into the track from transducer 21 or from the N register means 25. The transducers are spaced one computer word apart. The gap is formed by reading a word with transducer 21 from a previously stated location and writing the word back onto the track at the location of the write transducer 25.

Mechanizations for the N register, compare means, switch means, etc. are substantially the same as the mechanization described in connection with FIGURE 1. Mode control logic 26, including a counter, is connected to transducer 21 for determining a word containing all zeros on the recording track and for counting one for each word read by transducer 21.

In effect, the FIGURE 2 embodiment is similar to the FIGURE 1 embodiment except that transducer 3 (FIGURE 1) is moved forward until it coincides with transducer 2. As a result, one of the transducers can be eliminated. The only effect is that the comparison must be made during one rotational cycle and the insertion made during the next cycle.

In operation, assume that a word is contained in recirculating register N and is to be inserted into the correct position of an ascending ordered sequence of words stored on the recording track. The track is assumed to have a capacity of W words. Initially, a search is undertaken by means of logic 26 to determine the zero word. Mode control signals similar to the FIGURE 1 embodiment could be provided for controlling the operation. Subsequently, the words read by transducer 21 are compared with the words in register N until the word read by transducer 21 is determined to be greater than or equal to the word in the N register. Word times are counted and a search is made for the zero word. When the zero word is determined, a gap is formed by reading words from transducer 21 into transducer 24. The gap is precessed until the word count reaches W–2, at which time the N register contents are written into the recording track through transducer 24 for one word time. Following writing by transducer 21, the copy operation is terminated and N is re-loaded for the next cycle.

Figure 3:
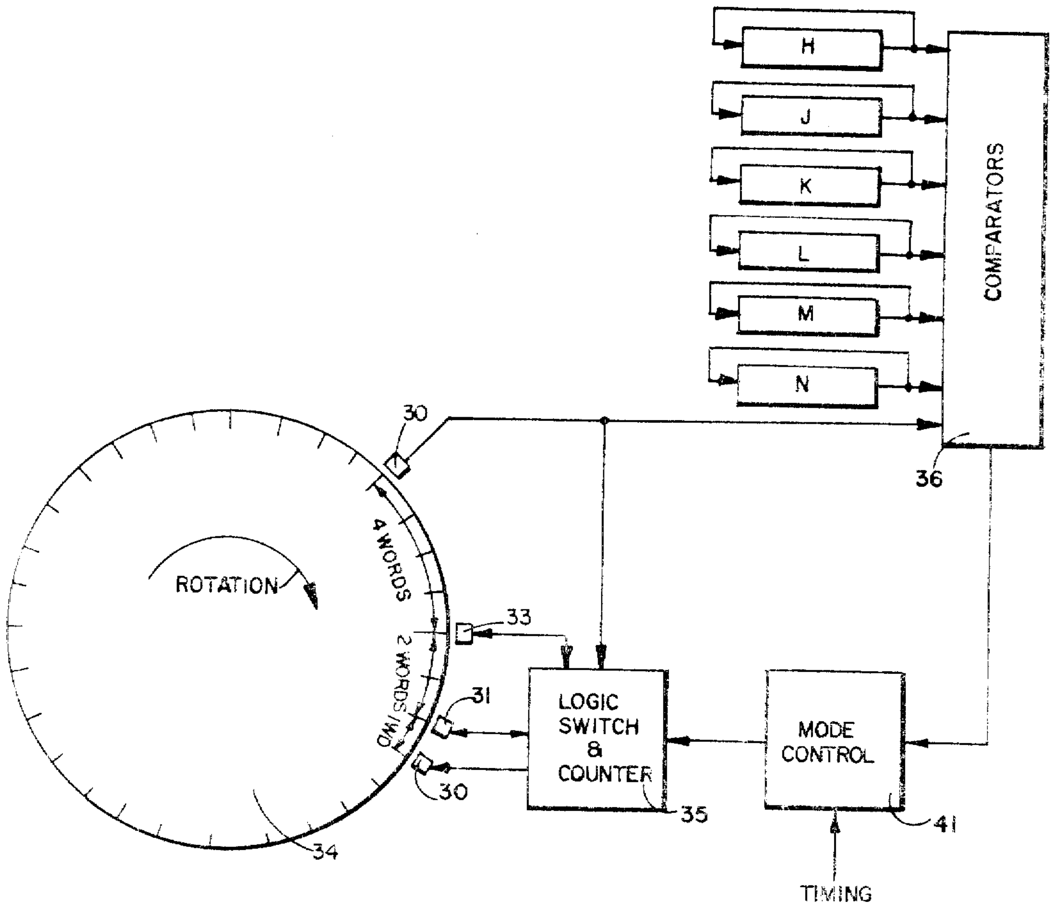
FIGURE 3 illustrates one embodiment of a system for inserting a plurality of computer words sequentially into a plurality of storage locations of an ordered storage track during one rotational cycle of the storage track.

As shown in FIGURE 3, by adding transducer 30, a plurality of registers and components to the FIGURE 1 embodiment, the system can be extended to provide for up to six insertions during a revolution of recording track 34. Computer word spacing between transducers 30 and 33 is 4 words; between transducer 33 and 31 is two words; and between transducers 32 and 31 is one word, in the direction of track rotation. In addition to transducer 33, switch means 35, including a control, is added to interconnect the transducers during the operation of the system. Mode control logic regulates operation of the system during the same process.

Switch 34 is connected between transducer 32 and the plurality of comparators 36. A plurality of one word recirculating registers N through H are connected to the comparators. Mechanization of various portions of the system is substantially the same as that required for FIGURE 1. For that reason additional details are not described. In other embodiments, a single six word recirculating register having six equal distant read heads may be used for storing data words to be inserted into the list.

In operation, assume that an ordered set of six words is awaiting insertion into the data stored on disc 34. Comparators 36 are provided for continuous magnitude testing between the output of head 30 and each of the six words awaiting insertion. Initially, a six word precessing gap is formed in the ordered sequence of data on the disc by copying the output of said head 30 into heads 33 and 31.

When the lowest value word to be inserted, for example N, is found to be less than a word read from head 30, the latter word exists on the track in each of three word portions following heads 30, 33 and 31 in the direction of rotation. During the next word time N is inserted into the sequence of data by write head 32 after which switch means 35 prevents head 31 from writing data received from transducer 30. Subsequently, head 31 reads its output into head 32. Head 30 continues to copy into head 33 and as a result, the gap is reduced from six to five words, with five words now awaiting insertion into the sequence on the recording track.

When the next higher word, M, is found to be less than a word read from head 30, the latter exists on the track in word positions following heads 30 and 33. No change occurs in head orientation during the next word time and the word on the track rotates to the word position preceding head 31. During the next word time, M is inserted into the head 32 while the previously mentioned word moves into the space between head 31 and head 32. At the end of that word time, head 32 is disconnected from writing by switch means 35 so that the precessing gap is reduced to the four word interval between transducers 30 and 33.

When the next higher word, L, is determined to be less than the word read by transducer 30, the latter exists in word positions following heads 30 and 33. No change occurs during the following two words to allow said word to rotate around the disc to the third word position after transducer 30. During the following word time it moves into the word position preceding transducer 33 and L is copied into head 32. At that time, transducer 33 ceases writing and begins copying the words on the recording track into transducers 31 and 32, so that a three word gap is formed between transducers 33 and 32.

When the next higher word, K, is found to be less than a word read by transducer 30, the latter exists in the word position following transducer 30. After a three word delay, the word rotates to the word position preceding transducer 33 and during the following word time it is copied from transducer 33 into transducer 31 while K is written into transducer 32. Thereafter, transducer 32 ceases to write and the precessing gap is reduced to the two word spacing between transducers 33 and 31.

At this time the configuration in effect is equivalent to the system described for inserting two words per revolution. Two alternate switching configurations may be used to insert the final highest words, J and H, into the recording track. One alternative would involve switching the comparator inputs from head 30 to head 33. The other alternative would be to continue comparing with head 30 and incur additional forward delay between the required comparison and the insertion of the word by write transducer 32.

The following table summarizes the head configurations and switching sequences previously described. The required delay shown in the table would be provided by a binary counter which may be included as part of logic switch and counter 35 in FIGURE 3. The subscripts *w* and *r* denote the used heads as either a read head or a write head.

| No. Words to be Inserted and Gap Size | Transducer Configuration | Words of Delay from 33 ≥ Word to be Inserted Until Insertion Time |
|---|---|---|
| 6 | $30_r \rightarrow 33_w$ and $31_w$ | 0 |
| 5 | $30_r \rightarrow 33_w$, $31_r \rightarrow 32_w$ | 1 |
| 4 | $30_r \rightarrow 32_w$ | 2 |
| 3 | $33_r \rightarrow 31_w$ and $32_w$ | 3 |
| 2 | $33_r \rightarrow 31_w$ | 4 |
| 1 | $31_r \rightarrow 32_w$ | 5 |

It should be noted that a technique similar to that shown in FIGURE 1 could be used initially to perform the required ordering of the six words N through H. The effective track size, and hence the access time, could be reduced with additional heads to form a rapid access recirculating register containing the head configuration of FIGURE 1.

It is possible to include logic so that multiple word insertions may be made into the recording track in cases where two or more of the words contained in the registers satisfy the condition of not exceeding the output from transducer 30 during the same word time. For example, assume the original six word gap and that two words M and N with M greater than N, fulfill the condition of being less than or equal to the word read by transducer 30. Since the output from transducer 30 was initially copied into transducers 33 and 31, the required word from transducer 30 would appear in position immediately following transducers 30, 33 and 31. At that time N may be written into transducer 32 followed by M during which time the word read by transducer 30 will have moved around to the space between transducers 32 and 31. After M is copied into transducer 32, transducer 32 ceases writing so that the gap is reduced to four words between transducers 32 and 33. Similar analyses of the remaining multiple insertions with all possible gap sizes can be shown to yield the desired results.

It should be obvious that the technique described herein can be extended to handle up to 14 insertions per revolution by the addition of another transducer placed eight word spaces opposite the direction of rotation from transducer 30; 30 insertions per revolution by adding still another transducer 16 words opposite the direction of rotation from that head; etc.

Although the invention has been described and illustrated in detail, it is to be understood that the same is by way of illustration and example only, and is not to be taken by way of limitation; the spirit and scope of this invention being limited only by the terms of the appended claims.

I claim:

1. A system for processing data words into either one of an array in ascending or descending order within a serial storage medium having a recording track, means for forming a precessing gap between adjacent storage locations, means for comparing data words at each location on said track with data words to be written on said track for determining the relative magnitudes of said words, said means for forming including means responsive to said means for comparing for writing said data to be written into said precessing gap.

2. The combination as recited in claim 1, wherein said means for comparing determines whether the data word on the track at a particular location is either greater or lesser than the data word to be written on said track, said determination being one or the other depending on whether the data words are being processed into an ascending or descending array.

3. The combination as recited in claim 1, wherein said means for comparing determines whether the data word on the track at a particular location is greater than the data word to be written on said track, whereby the data is processed into an ascending array and said data word to be written into said gap is written into the gap when the data at a particular location on the track is determined to be greater than the data word to be written on the track, said gap being located immediately before the data word on the track determined to be greater.

4. The combination as recited in claim 1, wherein said means for comparing determines whether the data word on the track at a particular location is lesser than the data word to be written on said track, whereby the data word being processed is processed into a descending array, and said data word to be written into said gap is written into the gap when the data word at a particular location on the track is determined to be lesser than the data word to be written on said track, said gap being located immediately after the data word on said track is determined to be lesser.

5. The combination as recited in claim 1, wherein said gap is at least equal to the number of data words to be written on said track during a single rotation of said track.

6. The combination as recited in claim 1, wherein said gap comprises a plurality of computer words and said means for forming includes means for reducing said gap each time a data word is written into the storage location forming said gap, said means for forming includes counter means for providing the required delay between the time that it is determined that a data word is to be inserted and the word is inserted.

7. The combination as recited in claim 1, including register means connected to said means for comparing for holding said data word to be written and including at least one read transducer means disposed adjacent to said recording track for transferring data words from said track to said means for comparing, whereby data words from said track are compared with the data word in said register means.

8. The combination as recited in claim 1, wherein said means for comparing includes read transducer means disposed adjacent to said recording track for reading data words to said means for comparing, and said means for forming comprises write transducer means connected for receiving data words from previous storage locations on said recording track and for writing the data words back on the track until a data word read by the read transducer is determined to have a required predetermined value relative to the data word to be written onto said recording track with the difference between said previous location and the location of said write transducer being equal to said gap, and said means responsive including means for activating said write transducer means for writing said data word into a storage location of said transducer either prior to the word on the track if the word was determined to be greater than the data word to be written and the data words were being processed into a list of ascending order, or after the word on the track if the word was determined to be lesser than the data word to be written and the data words were being processed into an array of descending order.

9. The combination as recited in claim 1, wherein said means for comparing comprises read transducer means disposed adjacent to said recording track for reading data words being compared with the data word to be written on said recording track, and said means for forming comprises write transducer means separated by at least one computer word from said read transducer means, and switch means connected between the write transducer means and read transducer means, said switch means including means responsive to said compare means and to said data word to be written for writing data words read by said read transducer means back onto said recording track and for discontinuing said writing when the data word read by the read transducer means is determined to have a predetermined value relative to the data word in said means for holding, means for shifting said data to be written to said write transducer means during the revolution following said determination so that the word is written into the gap between the transducer during the next revolution.

10. The combination as recited in claim 9, wherein said space is located immediately before the data word read by the transducer means if the data word had a value greater than the data word in said means for holding and if the data words were being processed into an ascending array.

11. The combination as recited in claim 9, wherein said space is located immediately after the data word read by the transducer means if the data word had a value lesser than the data word in said means for holding and if the data words were being processed into a descending array.

12. The combination as recited in claim 1, wherein means are included for controlling the sequence of operations of said system, said means for comparing includes at least a first read transducer and said means for forming comprises at least a second transducer and a write transducer spaced apart a number of computer words equivalent to said gap, switch means connected between said second read and write transducers for normally passing data from said second read transducer to said write transducer and including means responsive to said means for comparing for interrupting said passing of data words whenever the data word read by said first read transducer is determined to be greater than the data word to be written onto the said recording track, said switch means further includes means responsive to said data word to be written for passing said data word to be written to said recording track at a location on said recording track consistent with the processing of said data words into either one of the two arrays.

13. The combination as recited in claim 1, wherein means for forming comprises a plurality of spaced apart write transducers connected to a first read transducer means, said read transducer being spaced from at least one of said write transducer means by a number of computer words equivalent to said precessing gap, said other write transducer being spaced closer to said read transducer, means for disconnecting selected ones of a plurality of write transducer means from said read transducer means for reducing said space as said data word to be written is written onto said track at a storage location either prior to the location of the word on the track being compared or after the said word, depending on whether the data words on the track are being processed into an ascending or descending array.

References Cited

UNITED STATES PATENTS

| | | |
|---|---|---|
| 3,310,786 | 3/1967 | Rinaldi et al. |
| 3,299,411 | 1/1967 | Capozzi et al. |
| 3,295,107 | 12/1966 | Stalcup. |
| 3,273,131 | 9/1966 | Strohm et al. |

GARETH D. SHAW, *Primary Examiner*.